United States Patent
Shin et al.

(10) Patent No.: US 6,973,852 B2
(45) Date of Patent: Dec. 13, 2005

(54) PARKING BRAKE COMPRISING MECHANISM FOR ADJUSTING BRAKE CABLE TENSION

(75) Inventors: Hyun-Myung Shin, Daegu (KR); Moon-Hyuk Im, Daegu (KR); Jae-Cheon Lee, Daegu (KR); Tae-Ho Park, Daegu (KR); Kyung-Hee Cho, Daegu (KR); Byung-Hae Kim, Daegu (KR)

(73) Assignee: Kyung Chang Industrial Co., Ltd., Daegu (KR)

( * ) Notice: Subject to any disclaimer, the term of this patent is extended or adjusted under 35 U.S.C. 154(b) by 0 days.

(21) Appl. No.: 10/730,014

(22) Filed: Dec. 9, 2003

(65) Prior Publication Data

US 2005/0092559 A1 May 5, 2005

(30) Foreign Application Priority Data

Oct. 30, 2003 (KR) ................................ 10-2003-0076167

(51) Int. Cl.⁷ ................................................ F16C 1/10
(52) U.S. Cl. .......................................... 74/535; 74/523
(58) Field of Search .................... 74/523–536, 501.5 R, 74/541, 542; 188/82.7, 82.8, 196 B, 196 BA (56) References Cited

U.S. PATENT DOCUMENTS

| | | | |
|---|---|---|---|
| 3,974,713 A | 8/1976 | Toohey | 74/512 |
| 4,149,433 A | 4/1979 | Schröter | 74/516 |
| 4,265,345 A | 5/1981 | Fasano | 192/3 R |
| 4,271,718 A | 6/1981 | Bopp et al. | 74/522 |
| 4,440,269 A | 4/1984 | Harriott | 188/196 F |
| 4,515,036 A | 5/1985 | Dotson | 74/535 |
| 4,612,823 A * | 9/1986 | De Leeuw et al. | 74/533 |
| 4,787,263 A | 11/1988 | Jaksic | 74/501.5 R |
| 4,841,793 A | 6/1989 | Leigh-Monstevens et al. | 74/335 |
| 4,841,798 A * | 6/1989 | Porter et al. | 74/501.5 R |
| 4,850,457 A | 7/1989 | Taig | 188/72.1 |
| 4,875,563 A | 10/1989 | Larson et al. | 192/4 A |

(Continued)

Primary Examiner—Christopher P. Schwartz
(74) Attorney, Agent, or Firm—Roylance, Abrams, Berdo & Goodman, L.L.P.

(57) ABSTRACT

The present invention relates to a parking brake lever of a vehicle. The parking brake comprises a supporting member adapted to be fixed to a frame of the vehicle and provided with a ratchet portion; a parking brake lever mounted on the supporting member and oscillatable between a braked position and a released position; a braking pawl oscillatably mounted on the parking brake lever and engaging with the ratchet portion to prevent the parking brake lever from oscillating when the parking brake lever is in its braked position; a toothed member having a first toothed segment and a second toothed segment and oscillatably mounted on the parking brake lever; a tension-adjusting pawl adapted to engage with the first toothed segment and oscillatably mounted on the parking brake lever; a position-locking pawl adapted to engage with the second toothed segment and having a guided member; a spool having a cable fixing portion where a parking brake cable is fixed and fixed to the toothed member; and a guiding means having a first guiding segment and a second guiding segment along which the guided member of the position-locking pawl is guided.

The position-locking pawl is oscillatably mounted on the supporting member. The guided member is guided along the first guiding segment while the parking brake lever oscillates over a predetermined degree from the released position.

The position-locking pawl engages with the second toothed segment to prevent the toothed member and the spool from rotating while the guided member is guided along the first guiding segment during oscillation of the parking brake lever to the released position from the braked position.

4 Claims, 10 Drawing Sheets

U.S. PATENT DOCUMENTS

| | | | |
|---|---|---|---|
| 5,001,942 A | 3/1991 | Boyer | 74/535 |
| 5,180,038 A | 1/1993 | Arnold et al. | 188/171 |
| 5,217,094 A | 6/1993 | Walter et al. | 188/210 |
| 5,235,867 A | 8/1993 | Wortmann et al. | 74/501.5 R |
| 5,272,935 A | 12/1993 | Heinemann et al. | 74/523 |
| 5,293,517 A | 3/1994 | Andruet | 318/266 |
| 5,309,786 A | 5/1994 | Paré et al. | 74/512 |
| 5,448,928 A | 9/1995 | Harger | 74/523 |
| 5,467,666 A | 11/1995 | Soucie et al. | 74/575 |
| 5,477,746 A | 12/1995 | Perisho et al. | 74/512 |
| 5,533,420 A | 7/1996 | Perisho | 74/512 |
| 5,609,066 A | 3/1997 | Bunker et al. | 74/537 |
| 5,611,249 A | 3/1997 | Perisho et al. | 74/512 |
| 5,699,884 A | 12/1997 | Koch et al. | 188/196 B |
| 5,758,547 A | 6/1998 | Smale | 74/516 |
| 5,785,157 A | 7/1998 | Scott et al. | 188/156 |
| 5,787,761 A | 8/1998 | Wang | 74/535 |
| 5,875,688 A | 3/1999 | Porter et al. | 74/512 |
| 6,131,483 A | 10/2000 | Küller et al. | 74/535 |
| 6,244,129 B1 | 6/2001 | Krug et al. | 74/501.5 R |
| 6,244,394 B1 | 6/2001 | Gutierrez et al. | 188/72.8 |
| 6,282,980 B1 | 9/2001 | Sykes | 74/528 |
| 6,382,048 B1 | 5/2002 | Youn et al. | 74/529 |
| 6,533,082 B2 | 3/2003 | Gill et al. | 188/156 |

* cited by examiner

PARKING BRAKE COMPRISING MECHANISM FOR ADJUSTING BRAKE CABLE TENSION

FIELD OF THE INVENTION

The present invention relates to a parking brake of a vehicle. Specifically, the invention is directed to a parking brake wherein the cable tension is automatically adjusted to be maintained as a predetermined level even if the brake cable is loosen due to frequent operations.

BACKGROUND OF THE INVENTION

In general, a vehicle has a foot brake for performing a braking operation during driving and a parking brake for performing a braking operation when the vehicle is parked. The parking brake lever is generally operated by hand. Pulling the lever pulls a brake cable to carry out the braking operation.

Frequent braking operations can loosen the brake cable, causing insufficient tension, and thereby reducing the braking force. If the brake cable is loose enough, even fully pulling the parking brake lever may not perform the braking operation properly. In this circumstance, the vehicle should be repaired so that the cable length is adjusted by a repairman.

Many devices for automatically adjusting the brake cable tension have been developed.

For example, U.S. Pat. Nos. 5,272,935 and 6,382,048 disclose devices for automatically adjusting the brake cable tension. The described techniques employ elastic members such as a spring for automatically adjusting the brake cable tension. However, the structure of these devices is complex and is not easy to repair or assemble because of the large number of components.

SUMMARY OF THE INVENTION

The object of the present invention is to provide a parking brake comprising a mechanism for automatically adjusting brake cable tension, which has fewer components and is easier to assemble than conventional mechanisms.

A parking brake of a vehicle according to one embodiment of the invention comprises a supporting member adapted to be fixed to a frame of the vehicle and provided with a ratchet portion; a parking brake lever mounted on the supporting member and oscillatable between a braked position and a released position; a braking pawl oscillatably mounted on the parking brake lever and engaging with the ratchet portion to prevent the parking brake lever from oscillating when the parking brake lever is in its braked position; a toothed member having a first toothed segment and a second toothed segment and oscillatably mounted on the parking brake lever; a tension-adjusting pawl adapted to engage with the first toothed segment and oscillatably mounted on the parking brake lever; a position-locking pawl adapted to engage with the second toothed segment and having a guided member; a spool having a cable fixing portion where a parking brake cable is fixed and fixed to the toothed member; and a guiding means having a first guiding segment and a second guiding segment along which the guided member of the position-locking pawl is guided.

The position-locking pawl is oscillatably mounted on the supporting member. The guided member is guided along the first guiding segment while the parking brake lever oscillates over a predetermined degree from the released position.

The position-locking pawl engages with the second toothed segment to prevent the toothed member and the spool from rotating while the guided member is guided along the first guiding segment during oscillation of the parking brake lever to the released position from the braked position.

The parking brake may further comprise a first biasing means for biasing the tension-adjusting pawl toward the first toothed segment and a second biasing means for biasing the position-locking pawl toward the second toothed segment.

It is preferred that the guiding means is a guiding surface formed in the parking brake lever.

It is also preferred that the first toothed segment is formed so that the tension-adjusting pawl moves along the segment while the position-locking pawl engages with the second toothed segment during oscillation of the parking brake lever to the released position from the braked position.

It is further preferred that the guided member is a pin mounted on said position-locking pawl.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are provided for the purpose of illustrating preferred embodiments of the invention and are not to be construed as limiting the invention. In the drawings.

Throughout the drawings, like reference numbers will be understood to refer to like elements, features, and structures.

DETAILED DESCRIPTION OF THE EXEMPLARY EMBODIMENTS

Figure 1:
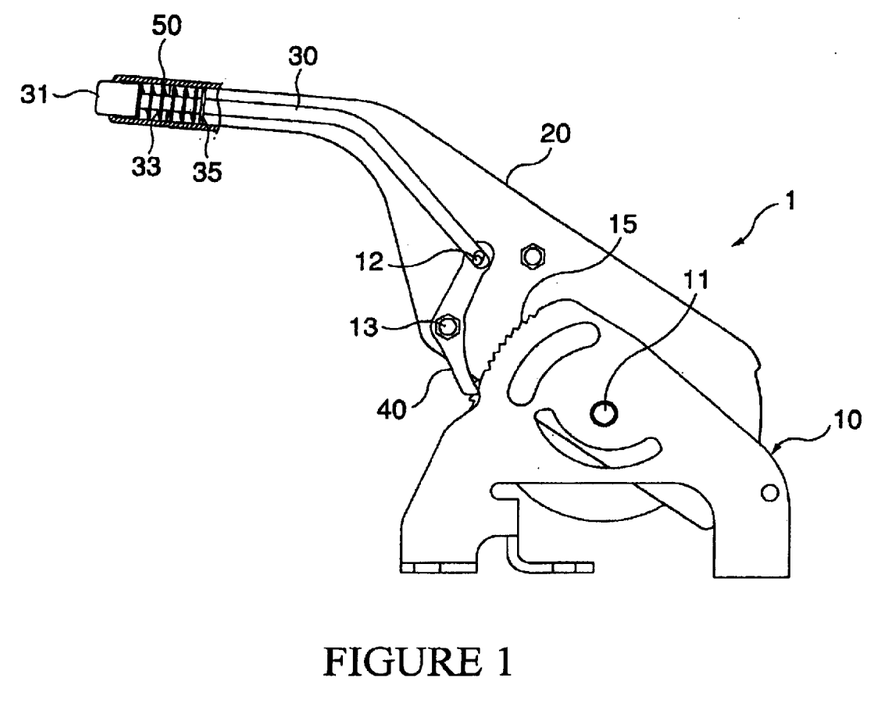
FIG. 1 shows a side view of a parking brake according to an embodiment of the invention.

As shown in FIG. 1, a parking brake 1 according to one embodiment of the invention comprises a supporting member 10 having a ratchet portion 15 formed therein, a parking brake lever 20 pivotably mounted to supporting member 10, an operating rod 30, a braking pawl 40 pivotably mounted to parking brake lever 20, and a push button 31 provided in one end of operating rod 30. Parking brake lever 20 is pivotable with respect to axis 11. Braking pawl 40 is fixed in operating rod 30 with pin 12 and is pivotable with respect to axis 13. Parking brake 1 further comprises a spring 33. One end of spring 33 is fixed to push button 31 and the other end of the spring is fixed to a stopper 35.

Parking brake lever 20 is pulled clockwise for braking, thereby moving braking pawl 40 to engage with ratchet portion 15 of supporting member 10. Pulling brake lever 20 results in pulling the brake cable wound in spool 2 (see FIG. 2). The braked position can be maintained since braking pawl 40 engages with ratchet portion 15.

For releasing, push button 31 is pushed, thereby releasing the engagement between braking pawl 40 and ratchet portion 15. Thereafter, parking brake lever 20 is oscillated to a normal position.

FIGS. 2–7 show the other side of parking brake 1. In this side, a mechanism for automatically adjusting brake cable tension is provided.

Figure 2:
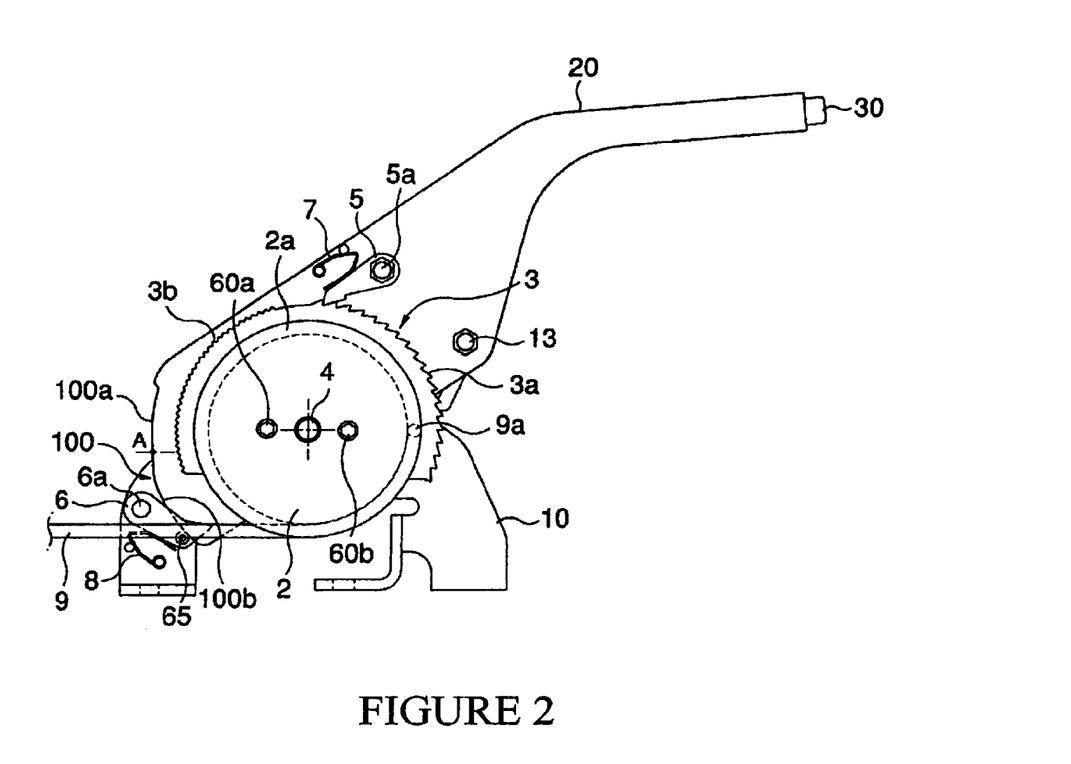
FIG. 2 shows a side view of the parking brake according to an embodiment of the invention in which a brake cable tension adjusting mechanism is provided.

As shown in FIG. 2, the mechanism for automatically adjusting brake cable tension comprises a spool 2, a toothed member 3, a tension-adjusting pawl 5, a position-locking pawl 6, a guide means 100, a first biasing means 7 and a second biasing means 8.

Toothed member 3 comprises a first toothed segment 3a and a second toothed segment 3b.

Spool 2 comprises cable fixing portion 9a for fixing parking brake cable 9, and winding groove 2a for winding brake cable 9. The spool 2 is mounted in parking brake lever 20 so as to be pivotable with respect to axis 4. In this embodiment, toothed member 3 and spool 2 are formed separately and thereafter are engaged each other with fixing means 60a, 60b. Alternatively, they can be formed integrally.

As shown in FIG. 2, the pitch of first toothed segment 3a is larger than that of second toothed segment 3b. However, the pitch of first toothed segment 3a may be smaller than that of second toothed segment 3b, according to other embodiments of the invention.

Tension-adjusting pawl 5 is engageable with first toothed segment 3a of toothed member 3 and is biased toward first toothed segment 3a by first biasing means 7. When tension-adjusting pawl 5 engages with first toothed segment 3a, toothed member 3 and spool 2 oscillate together with parking brake lever 2.

Position-locking pawl 6 is engageable with second toothed segment 3b, and is not engaged with the second toothed segment 3b in the releasing position, which is the initial state. Position-locking pawl 6 is also biased toward second toothed segment 3b by second biasing means 8. Further, position-locking pawl 6 is pivotable, centering around axis 6a, with respect to supporting member 10. Position-locking pawl 6 comprises a guided member 65 that is guided along guiding means 100. It is preferred that guided member 65 is a pin which is provided in position-locking pawl 6.

The rotation of toothed member 3 of spool 2 is prevented even when parking brake lever 20 is oscillated toward the released position, while position-locking pawl 6 engages with the second toothed segment 3b. First toothed segment 3a is formed as shown in FIG. 2 so that tension-adjusting pawl 5 moves along first toothed segment 3a while the rotation of toothed member 3 is prevented.

It is preferred that first biasing means 7 and second biasing means 8 are plate spring as shown in FIG. 2.

Guiding means 100 comprises first guiding segment 100a and second guiding segment 100b. It is preferred that the guiding segments are formed as curved surfaces in one lateral side of parking brake lever 20. Alternatively, guiding means 100 may be provided as more than one member and it should be understood that this also falls within the scope of the invention.

Guided member 65 is guided along second guiding segment 100b when parking brake lever 20 is oscillated to a braked position from the released position until the member reaches a predetermined point A. If parking brake lever 20 is rotated after the member 65 reaches the point A, guided member 65 is subsequently guided along first guiding segment 100a.

While guided member 65 is guided along second guiding segment 100b, position-locking pawl 6 does not engage with second toothed segment 3b. While guided member 65 is guided along first guiding segment 100a, position-locking pawl 6 engages with second toothed segment 3b.

Parking brake cable 9 is wound in winding groove 2a with the end thereof being fixed in fixing portion 9a of spool 2. Spool 2 rotates by pulling parking brake lever 20 to pull parking brake cable 9, thereby generating braking force.

Figure 3:
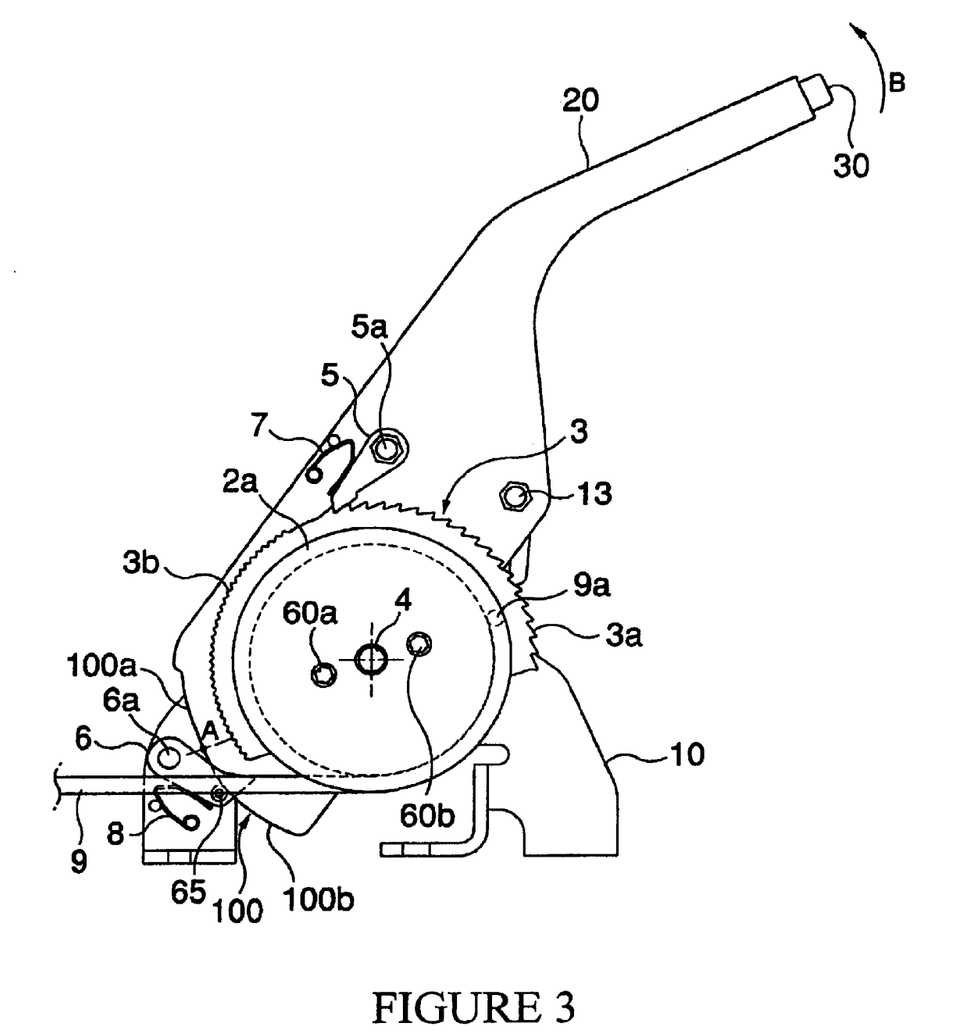
FIG. 3 shows a side view of the parking brake wherein the brake lever is pulled toward to braking position.

Oscillating parking brake lever 20 in the direction of arrow "B" as shown in FIG. 3 causes guided member 65 to move along second guiding segment 100b. The oscillation of the lever also causes spool 2 to rotate, thereby making position-locking pawl 6 closer to second toothed segment 3b. Unless parking brake cable 9 is looser than a predetermined level, braking is possible in the state shown in FIG. 3. Further, the mechanism for automatically adjusting cable tension does not operate since position-locking pawl 60 does not engage with second toothed segment 3b.

Figure 4:
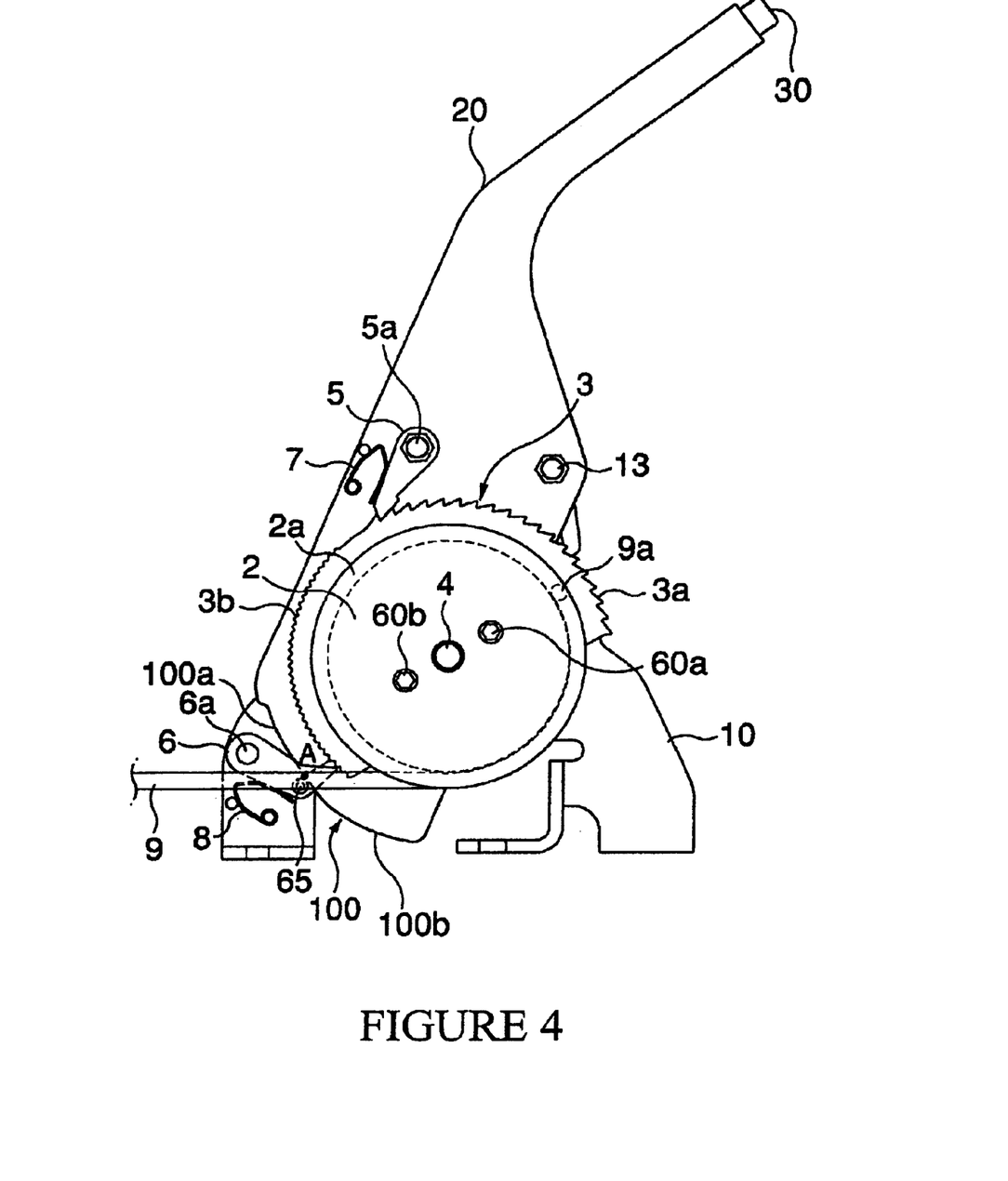
FIG. 4 shows a side view of the parking brake wherein the brake lever is pulled to a critical degree because the brake cable length is increased more than a predetermined amount.
Figure 5:
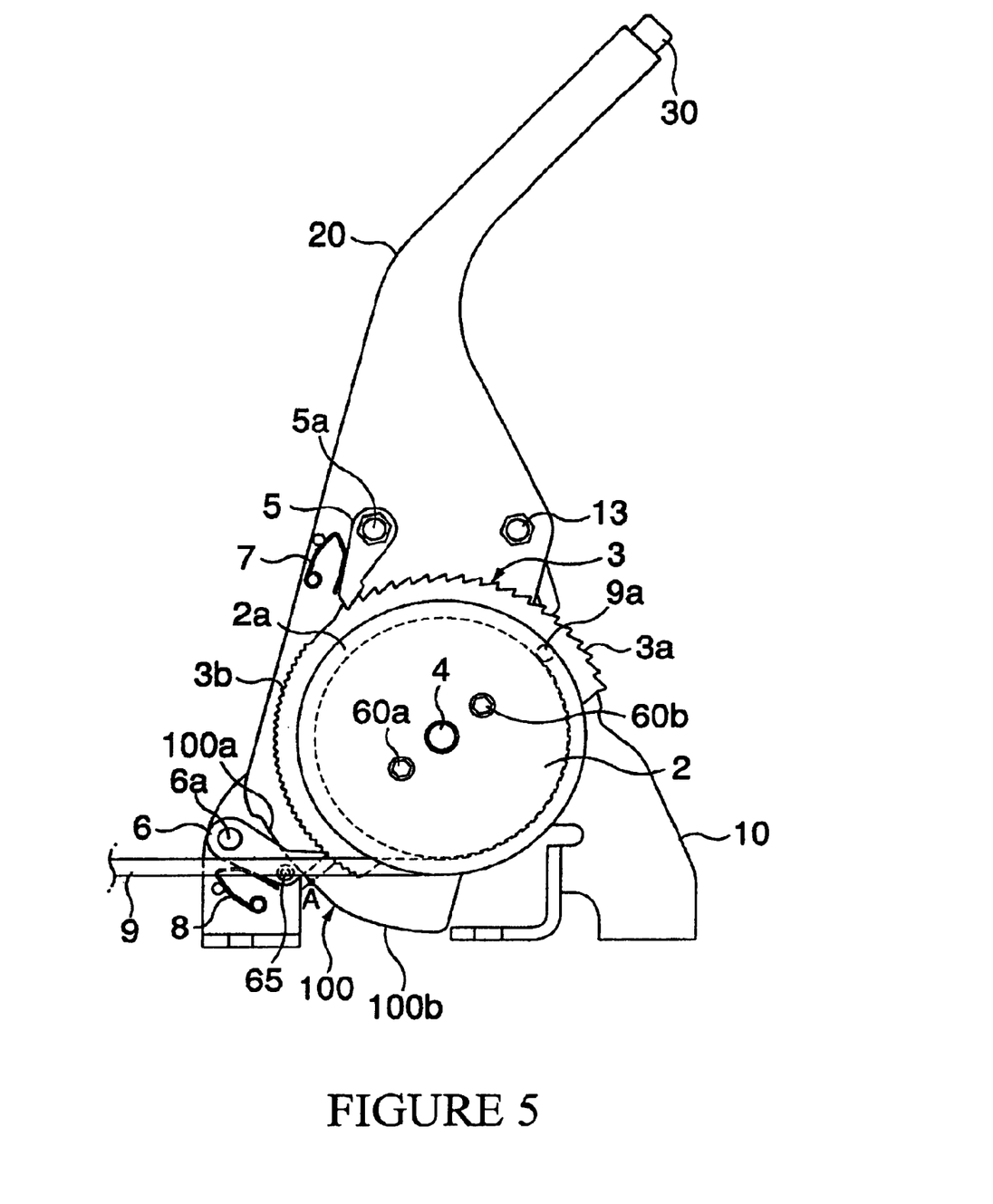
FIG. 5 shows a side view of the parking brake wherein the brake lever is pulled further that the critical position shown in FIG. 4.

However, if parking brake cable 9 is looser than a predetermined level, parking brake lever 20 will be pulled farther as shown in FIGS. 4 and 5 for proper braking. FIG. 4 shows a side view of the parking brake when guided member 65 of position-locking pawl 6 passes point A between first guiding segment 100a and second guiding segment 100b. FIG. 5 shows a side view of the parking brake when guided member 65 is guided along first guiding segment 100a due to further pulling of parking brake lever 20 compared with the state shown in FIG. 4. As described above, position-locking pawl 6 engages with second toothed segment 3b of toothed member 3 while guided member 65 is guided along first guiding segment 100a.

Figure 6:
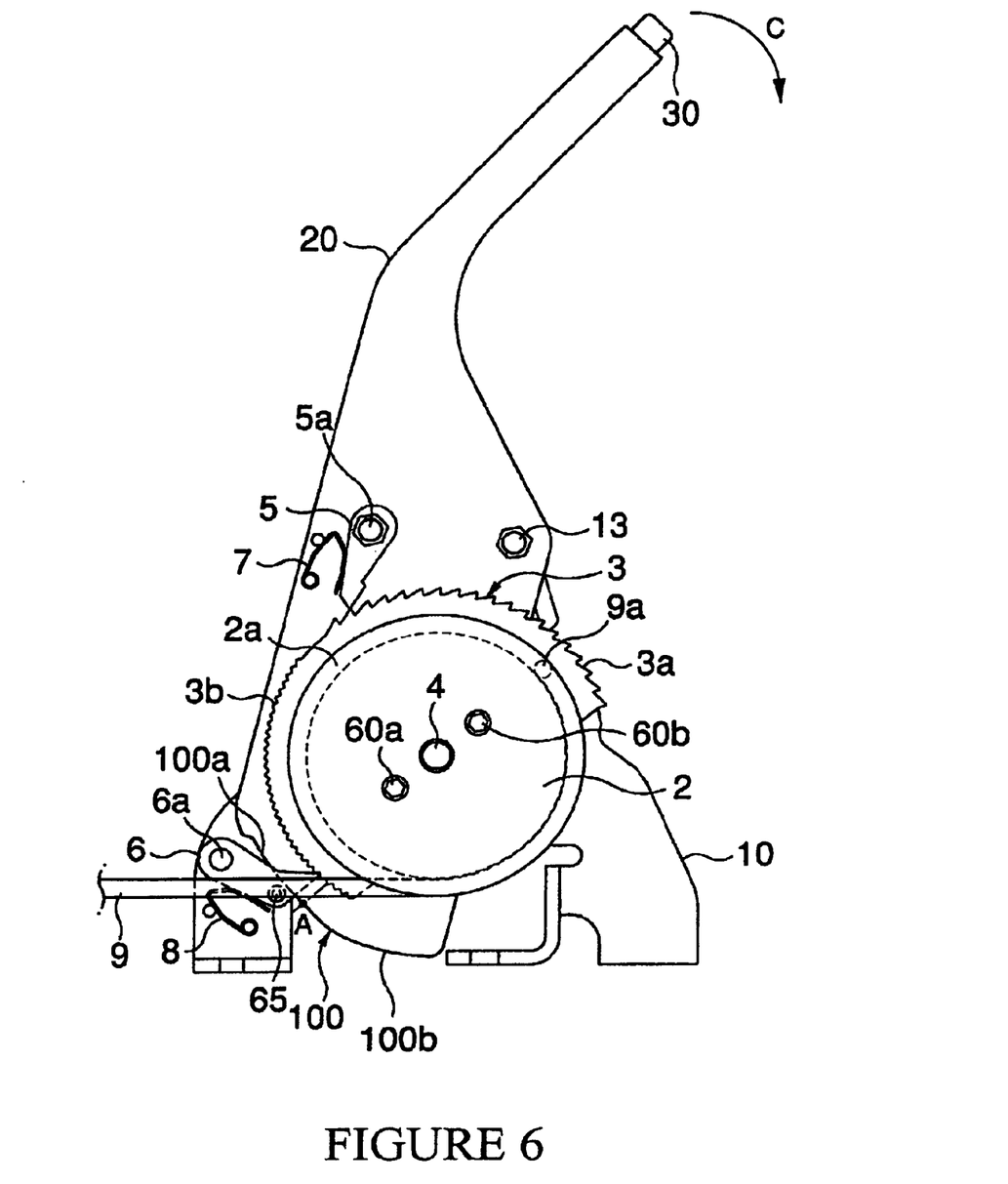
FIG. 6 shows a side view of the parking brake wherein the brake lever returns to a releasing position from the position shown in FIG. 5.

Guided member 65 starts to move along first guiding segment 100a, together with oscillation of parking brake lever 20 in the direction of arrow "C" as shown in FIG. 6 for releasing the braked condition. While guided member 65 moves along first guiding segment 100a, second toothed segment 3b of toothed member 3 engages with position-locking pawl 6, thereby preventing toothed member 3 and spool 2 from rotating. Thus, tension-adjusting pawl 5 moves along first toothed segment 3a as shown in FIG. 6.

Figure 7:
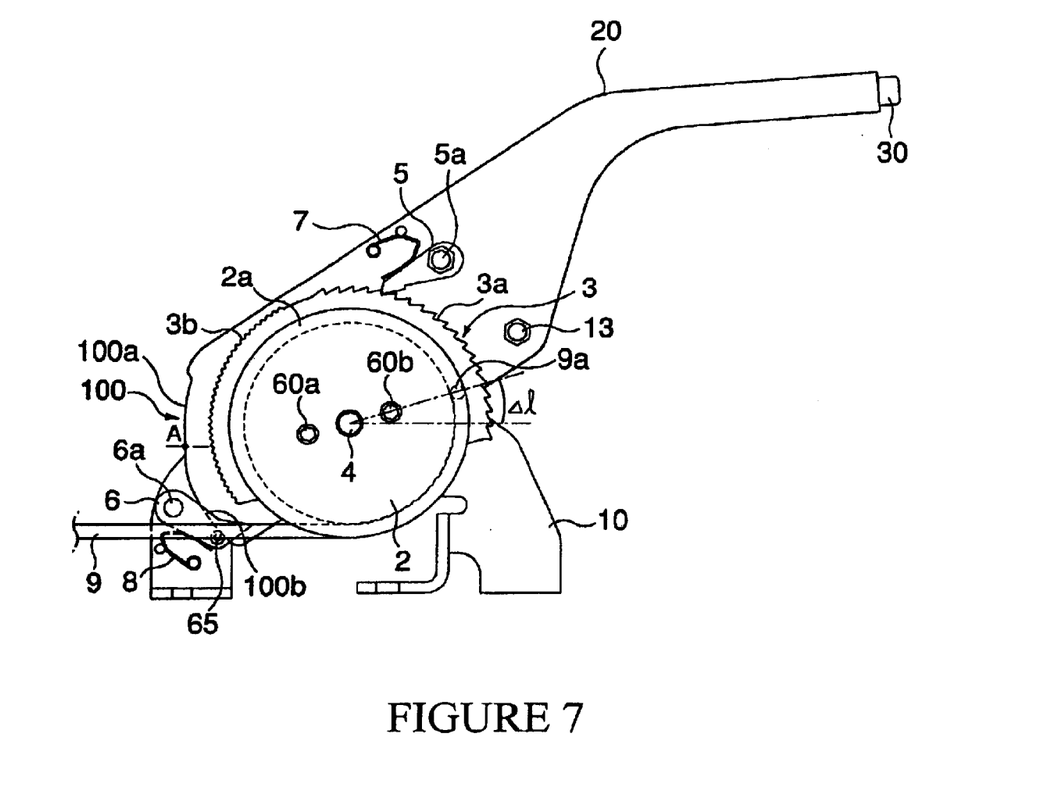
FIG. 7 shows a side view of the parking brake wherein the brake lever returns to a complete releasing position.
Figure 8:
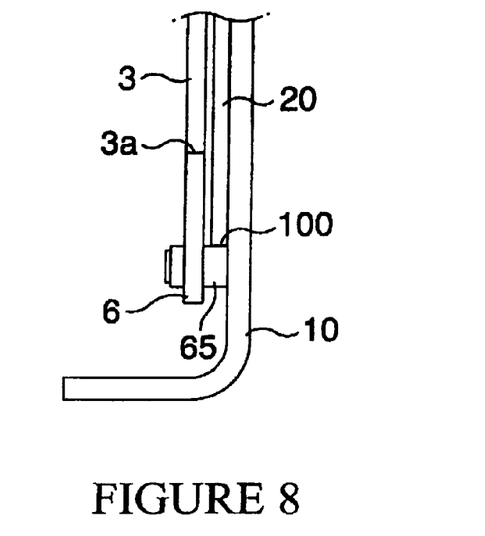
FIG. 8 shows a partial bottom view of the parking brake.
Figure 9:
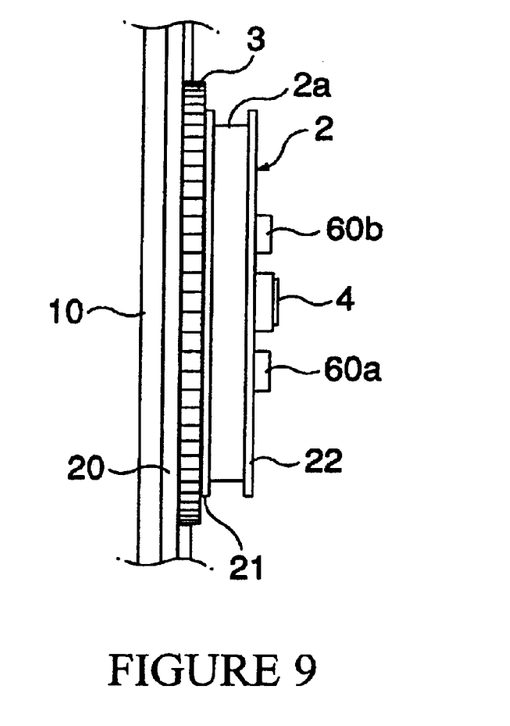
FIG. 9 shows a partial plan view of the parking brake.

In the complete released position as shown in FIG. 7, the engagement between position-locking pawl 6 and second toothed segment 3b is released and guided member 65 contacts with second guiding segment 100b. In particular, tension-adjusting pawl 5 is shifted by a predetermined pitch along first toothed segment 3a from the initial position and engages with first toothed segment 3a. That is, spool 2 further winds parking brake cable as much as Δl, thereby compensating for the loose length of the cable. Thus, the tension of the parking brake cable can be automatically adjusted without additional repair.

Figure 10:
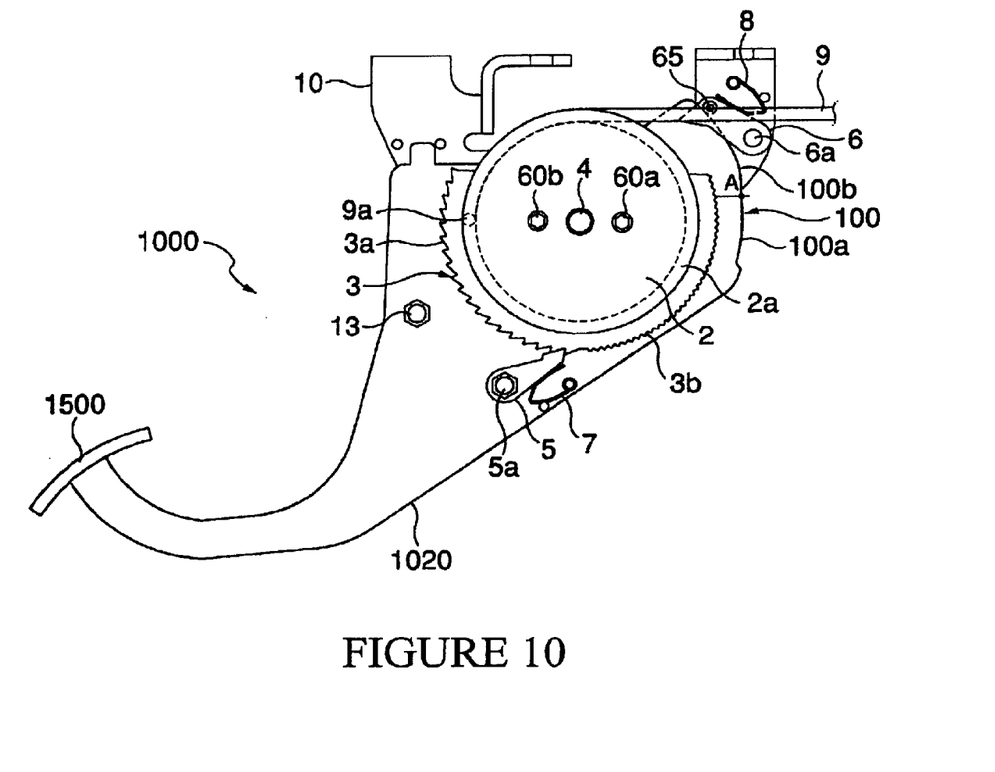
FIG. 10 shows a side view of a parking brake of another embodiment in a normal state.
Figure 11:
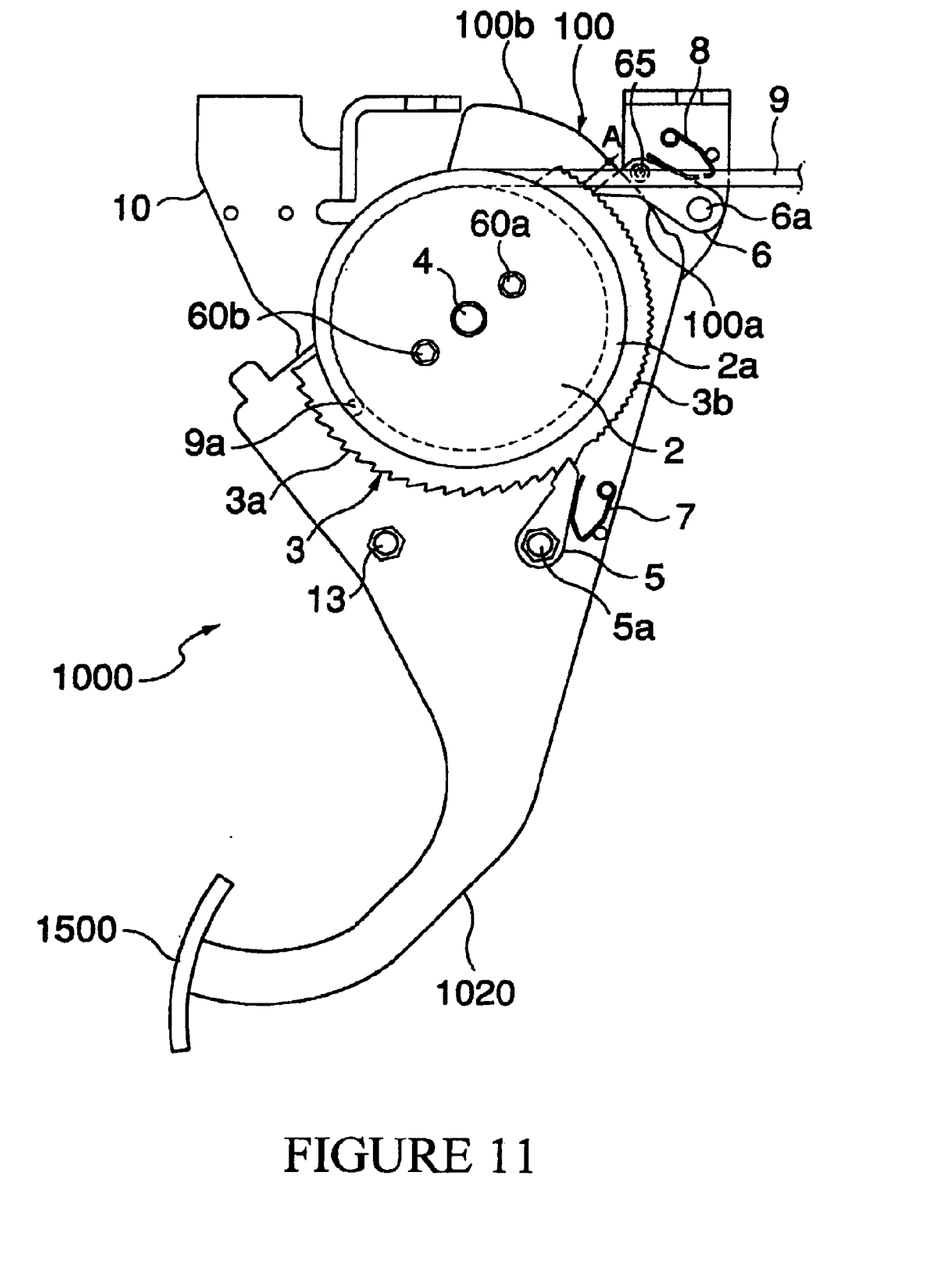
FIG. 11 shows a side view of the parking brake shown in FIG. 10 wherein the parking brake lever is in a braking position.

FIG. 10 shows a side view of a parking brake 1000 according to another embodiment of the invention. The parking brake 1000 is operated by foot, not hand. FIG. 11 shows a side view of the parking brake in its braked position.

The parking brake 1000 differs from parking brake 1 in that a driver operates the parking brake with his/her foot pressing pedal 1500 provided in one end of parking brake lever 1020 counterclockwise. The elements of parking brake 100 which have the same function as those of parking brake 1 are described with the same reference numerals as the elements of parking brake 1.

As described for parking brake 1 above, if parking brake cable 9 is loose over a predetermined amount, guided member 65 is guided along first guiding segment 100a while parking brake lever 1020 is oscillated toward its braked position. While guided member 65 is guided along first guiding segment 100a when the parking brake lever is oscillated toward released position, position-locking pawl 6 is engaging with second toothed segment 3b. Since, in this state, the rotation of toothed member 3 and spool 2 is prevented due to the engagement between position-locking pawl 6 and second toothed segment 3b, tension-adjusting pawl 5 moves along first toothed segment 3a. When guided member 65 reaches second guiding segment 100b, the engagement between position-locking pawl 6 and second toothed segment 3b is released. Finally, tension-adjusting pawl 5 moves as much as a predetermined pitch along first toothed segment 3a and engages with the segment. In this state, cable 9 is tightened as much as a predetermined amount as described in the above.

According to embodiments of the invention, it is possible to adjust the parking brake cable tension automatically since the cable is further wound in the spool as much as the extended length of the cable. Further, the structure of the parking brake using a guided member and guiding means becomes simple compared with the conventional art since it does not employ tension-adjusting mechanisms using spring means.

Embodiments of the invention have been described based on exemplary embodiments, which are not intended to limit the scope of the present invention, but rather to assist in understanding the invention. It will be appreciated by those skilled in the art that all of the features and combinations described herein of embodiments of the invention are not necessarily essential to the invention.

Although exemplary embodiments of the present invention have been described, it should be understood that those skilled in the art might make many changes and substitutions without departing from the spirit and the scope of the present invention which is defined only by the appended claims.

What is claimed is:

1. A parking brake for a vehicle, comprising:

a supporting member adapted to be fixed to a frame of a vehicle and provided with a ratchet portion;

a parking brake level mounted on said supporting member and oscillatable between a braked position and a released position;

a braking pawl oscillatably mounted on said parking brake lever and engaging with said ratchet portion to prevent said parking brake lever from oscillating when said parking brake lever is in its braked position;

a toothed member having a first toothed segment and a second toothed segment and oscillatably mounted on said parking brake lever;

a tension-adjusting pawl adapted to engage with said first toothed segment and oscillatably mounted on said parking brake lever;

a position-locking pawl adapted to engage with said second toothed segment and having a guided member, said position-locking pawl being oscillatably mounted on said supporting member;

a spool having a cable fixing portion where a parking brake cable is fixed and fixed to said toothed member; and a guiding means having a first guiding segment and a second guiding segment along which said guided member of said position-locking pawl is guided;

wherein said guided member is guided along said first guiding segment while said parking brake lever oscillates over a predetermined degree from the released position; and wherein said position-locking pawl engages with said second toothed segment to prevent said toothed member and said spool from rotating while said guided member is guided along said first guiding segment during oscillation of said parking brake lever to the released position from the braked position;

wherein said guided member comprises a pin mounted on said position-locking pawl.

2. The parking brake of claim 1, further comprising a first biasing means for biasing said tension-adjusting pawl toward said first toothed segment and a second biasing means for biasing said position-locking pawl toward said second toothed segment.

3. The parking brake of claim 1 or 2, wherein said guiding means is guiding surface formed in said parking brake lever.

4. The parking brake of claim 1 or 2, wherein said first toothed segment is formed so that said tension-adjusting pawl moves along the segment while said position-locking pawl engages with said second toothed segment during oscillation of said parking brake lever to the released position from the braked position.

* * * * *